United States Patent
Bou-Ghannam et al.

(10) Patent No.: US 7,743,130 B2
(45) Date of Patent: Jun. 22, 2010

(54) EXPOSING LOGIC FLOWS OF WEB SERVICES AND PERMITTING LOGIC FLOW MODIFICATIONS

(75) Inventors: Akram A. Bou-Ghannam, Lake Worth, FL (US); John W. Miller, Suwanee, GA (US); Ryan Rozich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 11/459,855

(22) Filed: Jul. 25, 2006

(65) Prior Publication Data

US 2008/0028020 A1    Jan. 31, 2008

(51) Int. Cl.
*G06F 15/173* (2006.01)
(52) U.S. Cl. ...................................... 709/223
(58) Field of Classification Search ........................ None
See application file for complete search history.

(56) References Cited

U.S. PATENT DOCUMENTS

| | | | |
|---|---|---|---|
| 6,636,855 | B2 | 10/2003 | Holloway et al. |
| 2002/0049603 | A1 | 4/2002 | Mehra et al. |
| 2003/0097345 | A1 | 5/2003 | Upton |
| 2004/0030740 | A1* | 2/2004 | Stelting ........................ 709/201 |
| 2004/0034770 | A1* | 2/2004 | Kaler et al. .................. 713/155 |
| 2004/0098311 | A1 | 5/2004 | Nair et al. |
| 2004/0133580 | A1 | 7/2004 | Liu et al. |
| 2005/0050228 | A1 | 3/2005 | Perham et al. |
| 2005/0050549 | A1 | 3/2005 | Joseph et al. |
| 2005/0060317 | A1 | 3/2005 | Lott et al. |
| 2005/0086178 | A1 | 4/2005 | Xie et al. |
| 2005/0192881 | A1 | 9/2005 | Scannell |
| 2006/0070024 | A1* | 3/2006 | Park ........................... 717/106 |
| 2007/0005642 | A1* | 1/2007 | Ghanaie-Sichanie et al. ..... 707/103 R |
| 2007/0282879 | A1* | 12/2007 | Degenkolb et al. .......... 707/101 |

* cited by examiner

*Primary Examiner*—Hussein Elchanti
*Assistant Examiner*—Clayton R Williams
(74) *Attorney, Agent, or Firm*—Patents on Demand, P.A.; Brian K. Buchheit (57) ABSTRACT

The invention discloses a method for specifying Web service behavior that includes a step of exposing an internal logic flow of a Web service to clients. The internal logic flow can include at least one activity, which is defined by a set of machine-readable instructions. A special invocation command for the Web service can be received from a client. The special invocation command can specify a modification for the activity. An instance of the Web service can be invoked for the client, where the Web service instance implements the modification instead of the activity.

17 Claims, 4 Drawing Sheets

EXPOSING LOGIC FLOWS OF WEB SERVICES AND PERMITTING LOGIC FLOW MODIFICATIONS

BACKGROUND

1. Field of the Invention

The present invention relates to the field of Web services and, more particularly, to exposing logic flows of Web services and permitting logic flow modifications.

2. Description of the Related Art

Web services represent reusable software building blocks that are Uniform Resource Locator (URL) accessible. Web services typically expose their capabilities to client applications and not their implementations. This allows Web services to be implemented in any computing language and on any platform and still be compatible with all client applications. Thus, internal details of Web services are abstracted from client applications causing each Web service to function as a black box having unknown internal logic. In theory, service providers can upgrade provided Web services and change the internal logic without affecting client applications that use the Web services.

Client applications, however, can sometimes care greatly about specific implementation details pertaining to Web services. As a result, a potential Web service customer can discover a Web service, which almost satisfies the customer's needs. This customer may desire some assurance relating to the implementation details for the discovered service, which is unavailable due to abstraction principles. The customer may also desire to slightly modify a non-exposed process of the Web service. Neither of these operations is possible using conventional technologies.

For example, a client application can use a Web service that determines credit ratings, which requires a social security number and returns a credit score between three hundred and eight hundred. The specification for the Web service may abstract implementation details of how the credit rating was obtained. It may be based upon a single credit score obtained directly form any of the three major credit bureaus (EXPERIAN, EQUIFAX, and TRANSUNION). It could also be based upon an algorithm that averages two or three of these ratings to determine an averaged credit score. The underlying logic can be extremely important, since different companies (which are potential customers of the Web service) can have company specific rules as to how a credit score is to be calculated.

Using current technologies, a potential customer can choose to utilize a Web service, such as a credit rating Web service, without knowing details of the Web service. Possibly more problematic, the customer can initially seek and use a Web service having desired internal logic, which is abstracted for the Web service and is therefore not guaranteed. Later, after a client application has been using the Web service, internal logic of the Web service being utilized can unexpectedly change unbeknownst to the customer as a result of a Web service upgrade. Consequently, the client application supporting a customer can utilize logic for business decisions that is no longer compliant with business guidelines established by the customer.

To avoid the above problems, customers often create customized versions of Web services, which are similar to a more commercial one, yet which is adapted to a customer's specific needs and/or which the customer can control. Many potential advantages of Web services, such as widespread reuse, efficiencies of scale, and the like are not achieved in practice due to the above problems.

Today, few high-level Web services (which can be incrementally built using multiple component Web services) or application-level Web services are in widespread use due to an inability of potential customers to tailor these services for customer specific situations. Instead, Web services are most commonly used for discrete, low-level functions. For Web services to realize their potential as a general-purpose distributed software technology for creating and joining different remotely located software building blocks, new techniques and technologies are needed.

SUMMARY OF THE INVENTION

The present invention discloses a solution to expose logic flow of Web services to Web service users. The logic flow can include a series of choreographed activities that are implemented with the Web service. Activities can include other Web services, software objects, software procedures, and any set of digitally-encoded, computer-readable instructions capable of being interpreted by a computing device. Each activity can have a known starting and ending point and can have specified interface parameters. A user of the Web service can substitute a modified activity for a Web service activity so long as proper interface parameters are maintained. Any differences can be handled using a transform that includes interface mapping code. The modified activity can consist of a different Web service, specified by a URL. In one arrangement, a special Web service invocation procedure can be used for specially invoking the Web service.

The present invention can be implemented in accordance with numerous aspects consistent with the material presented herein. For example, one aspect of the present invention can include a method for specifying Web service behavior. The method can include a step of exposing an internal logic flow of a Web service to clients. The internal logic flow can include at least one activity, which is defined by a set of machine-readable instructions. A special invocation command for the Web service can be received from a client. The special invocation command can specify a modification for the activity. An instance of the Web service can be invoked for the client, where the Web service instance implements the modification instead of the activity.

Another aspect of the present invention can include a method for a client to selectively modify a Web service. In the method, a Web service provided by a service provider can be selected. A logic flow of the Web service can be ascertained. The logical flow can include at least one activity. When the Web service is invoked normally, the service provider can execute code associated with the activity. A different Web service can be specified that is to replace the activity. The Web service can be specially invoked causing the Web service to execute the different Web service in place of code typically associated with the activity.

Still another aspect of the present invention can include a system for providing Web services that permits calling applications to modify internal logic flow of the services. The system can include at least one Web service that exposes internal logic flow. The internal logic flow can include many programmatically defined activities. A user selectable option for invoking the Web service normally can exist. This option can cause the Web service to execute the activities in accordance with the internal logic flow. A user selectable option for specially invoking the Web service can also be provided in the system, which causes the Web service to substitute a user specified modification in the place of one of the activities while executing unmodified ones of the activities in accordance with the internal logic flow. The user specified modification can be specified in an XML based document. Additionally, the modification can be a different Web service, where different service providers can provide the Web service and the different Web service.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
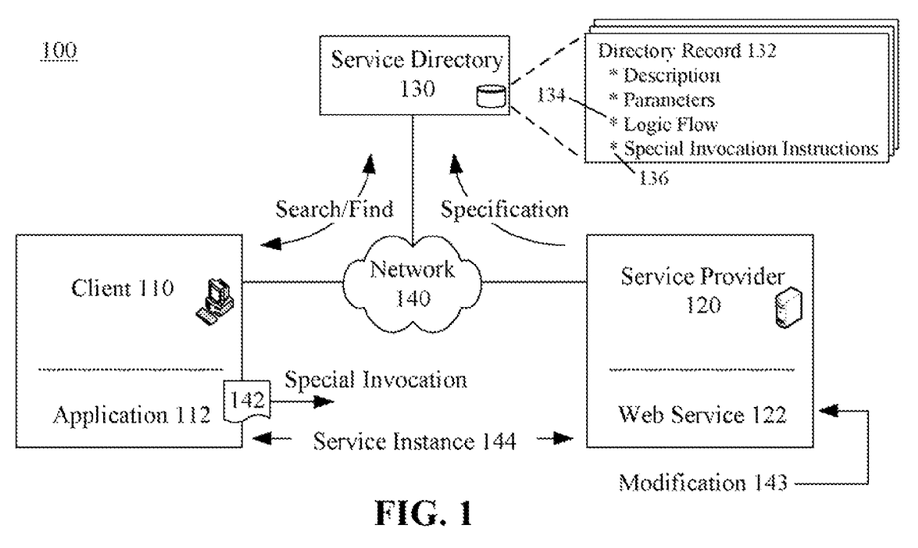
FIG. 1 is a schematic diagram of a system for exposing and permitting modifications of logic flows of Web services in accordance with an embodiment of the inventive arrangements disclosed herein.

FIG. 1 is a schematic diagram of a system 100 for exposing and permitting modifications of logic flows of Web services in accordance with an embodiment of the inventive arrangements disclosed herein. System 100 includes a client 110, a service provider 120, and a service directory 130 communicatively linked through network 140. The service provider 120 can provide a Web service 122, which is used by client application 112. A specification of the Web service 122 being published to the service directory 130, which can be searched by client 110 in order to discover Web service 122 and its details.

The Web service 122 can represent reusable software building blocks that are Uniform Resource Locator (URL) accessible. Web service 122 provides a standardized way of integrating Web-based applications executed by the service provider 120 with remotely located client applications 112 over an Internet Protocol (IP) backbone. Web services 122 can rely upon many open standards including eXtensible Markup Language (XML), Simple Object Access Protocol (SOAP), Web Service Description Language (WSDL), and Universal Description, Discovery and Integration (UDDI) standards.

Unlike conventional Web services, Web service 122 can expose a logic flow that details activities performed by the Web service 122. For example, a directory record 132 for Web service 122 stored in service directory 130 can include logic flow data 134 and special invocation instructions 136. The directory record 132 can also include information normally associated with a Web service, such as a Web service description and input/output parameters for the Web service 122.

The service directory 130 can be an online directory that provides a uniform way for businesses and organizations to describe available services, service capability, required interface parameters, and output parameters resulting from the described services. The services of the directory 130 can include all services available to client 110, such as services provided by service provider 120. In one embodiment, the service directory 130 can use an XML based directory of Web services. Web services specified in the service directory 130 can be described using a WSDL based language. The service directory 130 can be a UDDI compliant directory.

Logic flow data 134 can specify details for internal programmatic logic and associated parameters. For instance, logic flow data 134 can specify that the Web service 122 includes multiple activities. Each activity can be a definable software unit, such as a method, a procedure, a software object, a routine, a component Web service, and the like. Activities can have unique identifiers or names, starting points, ending points, parameters, and constraints associated with them, each of which is described by the logic flow data 134.

The special invocation instructions 136 can detail which of the activities of the logic flow are able to be modified, such as by modification 143, and the manner and extent to which these modifications can occur. For example, the special invocation instructions 136 can specify a format and parameters for generating special invocation commands 142. Thus, the special invocation instructions 136 can be used to establish "contracts" between clients 110 and service providers 120 related to the use and/or modification of provided Web services 122.

In one embodiment, authorization information, pricing information (assuming for-fee Web services), licensing information, and the like can be included in the special invocation instructions 136. Unique WSDL tags can exist for specifying logic flow 134 and/or special invocation instructions 136.

Modification 143 can be any set of programmatic instructions designed to replace an activity of logic flow 134. As such, modification 143 can represent a customization of the logic flow 134 of Web service 122. In one embodiment, modification 143 can be implemented as a Web service executed as a component of a primary Web service 122, which it modifies. The modification 143 can override functions and/or features normally executed for Web service 122 and can also implement additional features for Web service 122. While it is possible for service provider 120 to develop and enable modification 143, perhaps as part of a customized extension package compatible with Web service 122, modification 143 is often a customization developed and maintained by a third-party service provider (not shown), by client 110, and/or by an agent of client 110.

Service provider 120 can be a network-addressable entity that provides one or more Web services 122. Service provider 120 can be a provider of a primary Web service 122 and/or a provider of a modification 143. Additionally, service provider 120 can utilize SOAP based communications to provide service instance 144 to client application 112 upon request. Service provider 122 can permit a provided Web service 122 to be invoked normally, which causes a default logic flow to execute, and/or to be invoked specially 142, which causes modification 143 to replace at least one activity.

Client 110 can be a computing device capable of executing application 122, which can invoke 142 and utilize Web service 122. Client 110 can include, but is not limited to, desktop computers, servers, mobile telephones, tablet computers, personal data assistants (PDAs), digital media players, and the like.

Network 140 can include any hardware, software, and firmware necessary to convey data encoded within carrier waves. Data can be contained within analog or digital signals and conveyed though data or voice channels. Network 140 can include local components and data pathways necessary for communications to be exchanged among computing device components and between integrated device components and peripheral devices. Network 140 can also include network equipment, such as routers, data lines, hubs, and intermediary servers which together form a data network. Network 140 can also include circuit-based communication components and mobile communication components, such as telephony switches, modems, cellular communication towers, and the like. Additionally, network 140 can include line based and/or wireless communication pathways.

The following operational example shows how components of system 100 interoperate. In the example, service provider 120 can provide Web service 122, which can return a credit rating score associated with a social security number. The normally exposed parameters for Web service 122 include an input parameter for social security number and an output parameter for crediting rating. As detailed by logic flow data 134, the credit rating can be computed as an average of the scores returned from each of the three credit bureaus, EXPERIAN, EQUIFAX, and/or TRANSUNION. The logic flow 134 can include an Activity A that fetches the EXPERIAN credit score, an Activity B that fetches the EQUIFAX score, an Activity C that fetches the TRANSUNION score, and an Activity D that calculates an averaged score, by adding the scores of Activity A-C and dividing by three.

Client 110 can be used by a company having internal rules for credit scores, which dictate that credit scores are to be calculated by as a weighed average of scores received from the credit bureaus, where an EXPERIAN score is fifty percent of the calculated score, an EQUIFAX score is thirty percent of the calculated score, and a TRANSUNION score is twenty percent of the calculated score. Client 110 can discover/create modification 143 that replaces Activity D and that calculates a score in accordance with the internal rules of the company. A special invocation command 142 that replaces Activity D with modification 143 can be sent to service provider 120. The format of command 142 can adhere to standards and content stated in special invocation instructions 136. The service provider 120 can then generate service instance 144, which returns credit scores in accordance with the company's rules.

In another example, Web service 122 can be a business credit validation service that receives a business name and address and determines a credit rating for the business. The logic flow 134 for the Web service 122 can reveal that the business name and address are translated into a Data Universal Numbering System (DUNS) identifier. The DUNS number can be used to determine parent-child relationships existing between parent and subsidiary companies. For example, the DUNS number can determine that HERTZ is a subsidiary of FORD. The business credit rating returned by the Web service 122 can depend upon credit ratings of the named business as well as parents/subsidiaries of that business. Hence, an accurate credit rating can depend upon an accuracy of DUNS parent-child information, which can be obtained from different sources updated at different intervals. A value added service provider (not shown) can create modification 143 for Web service 122, which obtains DUNS parent-child information from a more accurate data source than that used for Web service 122 by default. The value added service provider can register modification 143 (implemented as a Web service) with directory 130 and can provide details needed to specially invoke Web service 122 so that modification 143 is used to obtain DUNS parent-child information. Client 110 can choose to use Web service 122 as modified by modification 143, which can be communicated to service provider 120 via special invocation command 142.

Figure 2:
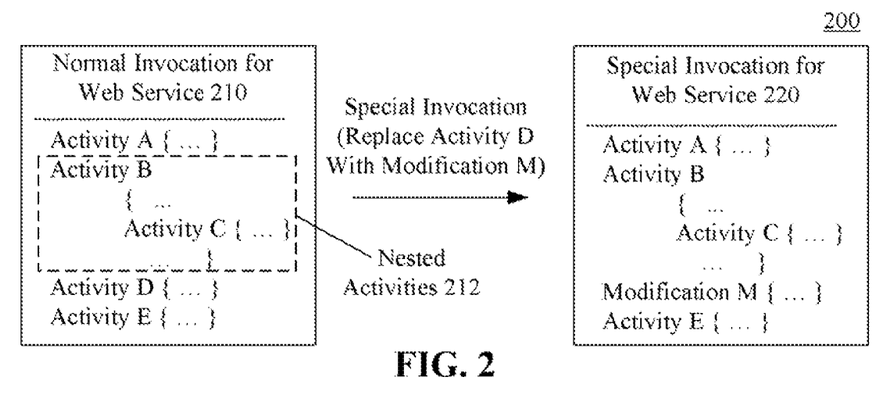
FIG. 2 is a system showing two different execution flows for a Web service depending upon whether the service is invoked normally or specially in accordance with an embodiment of the inventive arrangements disclosed herein.

FIG. 2 is a system 200 showing two different execution flows for a Web service depending upon whether the service is invoked normally or specially in accordance with an embodiment of the inventive arrangements disclosed herein. System 200 can represent programmatic logic for Web service 122 executed by service provider 120 in system 100.

The Web service of system 200 can include Activities A-E, each activity being a set of programmatic instructions executed for the Web service. Activities of the Web service can be nested inside other activities, as shown by nested activities 212, where Activity C executes completely inside code of Activity B. One or more of the activities can include one or more Web services.

It should be appreciated that in conventional systems, Activities A-E are abstracted from external entities and software applications. The present invention provides a mechanism that exposes these activities, as detailed in system 100.

When the Web service is invoked in a normal fashion (210), code for Activity A is executed, followed by code for Activity B. Code for Activity C is executed during the execution of Activity B. After Activity B executes, Activity D can execute, followed by Activity E. When the Web service is invoked in a special manner, such as when Modification M is to be substituted for Activity D (220), code for Activity A can be executed, followed by code for Activity B. Code for Activity C is executed during the execution of Activity B. After Activity B executes, Modification M can execute, followed by Activity E. Modification M can be a Web service.

Each Activity A-E and Modification M can have a known execution starting point and an execution ending point. Further, each Activity A-E and Modification M can have activity-specific parameters and constraints. The invention permits external applications to substitute a modification for any of the Activities A-E, which causes the modification to start executing at the execution starting point of the substituted activity and causes the Web service to resume executing code from the ending point of the substituted activity once the modification has finished executing. Therefore in invocation 220, the starting point of Modification M is mapped to the starting point for Activity D and the ending point of Modification M is mapped to the ending point of Activity D. When parameters accepted or generated by the modification do not exactly match the activity which it substitutes, transformations can be used to reconcile these differences.

Figure 3:
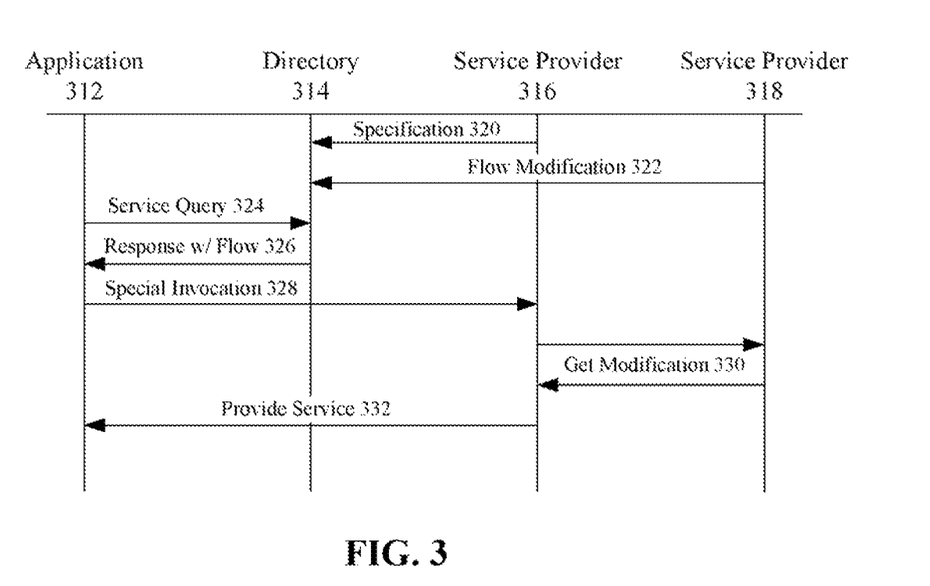
FIG. 3 is a flow diagram of communication flows relating to a special invocation of a Web service in accordance with an embodiment of the inventive arrangements disclosed herein.

FIG. 3 is a flow diagram of communication flows relating to a special invocation of a Web service in accordance with an embodiment of the inventive arrangements disclosed herein. The flows of FIG. 3 can occur within the context of system 100. FIG. 3 shows application service provider 316 and 318, each providing a Web service that is published in directory 314. Application 212 can invoke the Web services of service provider 316 and/or 318. The service of provider 318 is designed to replace an activity of a Web service provided by service provider 316. Thus, service provider 318 can be a provider that customizes existing Web services produced by others to match the needs and/or request of various Web service users.

In FIG. 3, service provider 316 can publish specification 320 to service directory 314. The specification 320 can include a logic flow for the Web service as well as special invocation instructions. The logic flow of the Web service can include multiple activities, their starting points, end points, and required parameters. Provider 318 can discover the logic flow of the Web service by querying directory 314. Provider 318 can then develop a flow modification 322 to one of the activities, which is itself a Web service. The flow modification 322 can be published to directory 314. In step 324, application 312 can query directory 314. A response 326 can include multiple Web services and their logic flows. For example, response 326 can include the Web service of service provider 316 as well as flow modification 322 by provider 318. Instructions for specially invoking the Web service to utilize flow modifications can also be conveyed in the response 326. Accordingly, application 312 can specially invoke 328 the Web service as modified by the flow modification. Service provider 316 can obtain the flow modification from service provider 318 and can provide the requested service 322 to application 312.

Figure 4:
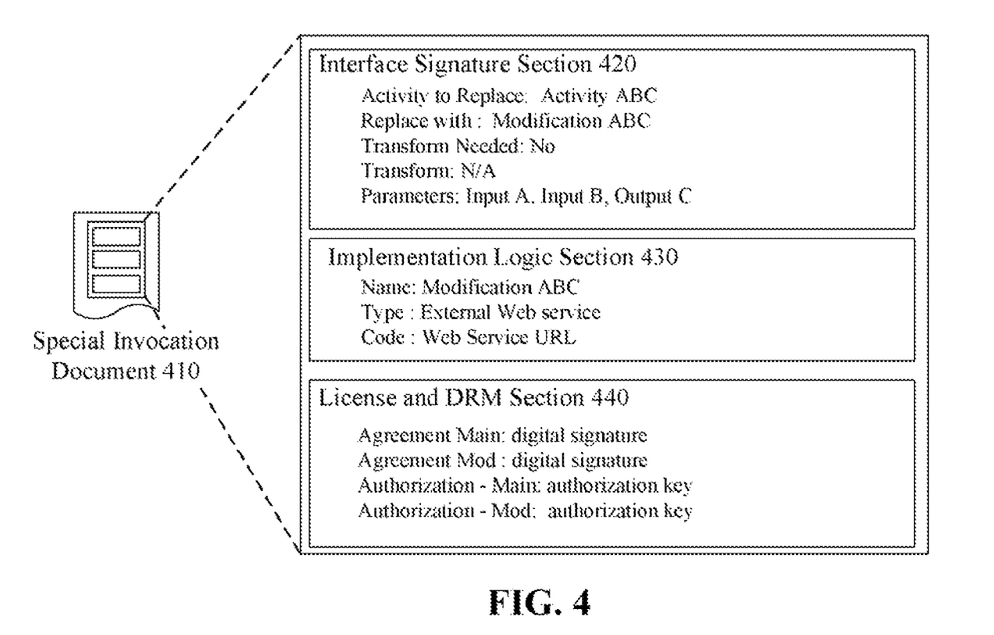
FIG. 4 is a diagram showing a special invocation document for specially invoking a Web service in accordance with an embodiment of the inventive arrangements disclosed herein.

FIG. 4 is a diagram showing a special invocation document 410 for specially invoking a Web service in accordance with an embodiment of the inventive arrangements disclosed herein. In context of system 100, document 410 can be included in special invocation command 142. The special invocation document 410 can be implemented in any of a variety of manners. For example, the special invocation document 410 can be an XML based document that is conveyed between a client and a service provider when specially invoking a Web service.

Document 410 can include an interface signature section 420, an implementation logic section 430, and a license and digital rights management (DRM) section 440. Interface signature section 420 can specify the inputs and outputs of an activity to be replaced. As shown, Activity ABC is being replaced by Modification ABC. The interface signature section 420 can include the parameters needed by the Activity ABC, such as Input Parameter A, Input Parameter B, and Output Parameter C. The interface signature section 420 can also specify whether a transform is needed to reconcile differences between an activity (Activity ABC) and a modification (Modification ABC) that replaces the activity. A suitable transform can be specified and used when appropriate.

Implementation Logic Section 430 can specify the actual execution code of the modification that is to be executed by a Web service. Different types of execution code can be specified, depending upon a manner in which the modification is implemented. For example, the Modification ABC can be implemented as an external Web service, which is specified by a Web service URL.

Modifications are not limited in this regard and any of a variety of implements is possible. In one embodiment, the modification can be an internal Web service (not published in a UDDI directory or generally available to the public), which can be referenced through a non-public Web service URL or a secure network channel. The private modification can contain proprietary algorithms and/or IP protected material that a user/client of the Web service, who may also be an owner of the modification, wishes to remain confidential or secret. Further, the modification can be an executable code module that is conveyed to and directly executed by a service provider as a substitute to Activity ABC.

License and Digital Rights Management section 440 is an optional section that can be used to verify a right to use a Web service and/or modification and can electronically establish legal agreements relating to Web services and/or modifications. Agreements and/or authorizations can exist for both a primary Web service and the modifications, as shown in section 440.

In one contemplated operational example, section 440 can be used to establish agreements similar to the GNU General Public License, which is used for many LINUX programs. The agreement can be associated with the Web service and/or one or more of the component activities of the Web service or modifications of the same. The agreement can define important software rights like usage rights, rights to derivative works, and the like. Additionally, Digital Rights Management (DRM) protections can be established to ensure that Web services, activities, and/or modification can only be utilized/modified in a manner agreeable by a Web service owner. Consequently, a Web service and/or modification owner can retain control over intellectual property rights, while granting users and/or business partners greater flexibility in accordance with the inventive arrangements disclosed herein.

It can be appreciated that exposing logic flow for Web services as well as rights associated with the logic flow can result in innovation and cooperation efforts among many programmers and/or programming teams, thereby creating a cooperative atmosphere for Web services that does not currently exist. This cooperative atmosphere is similar to that spawned by the open source software initiative, which has proven to be extremely successful for many efforts relating to the LINUX platform.

Figure 5:
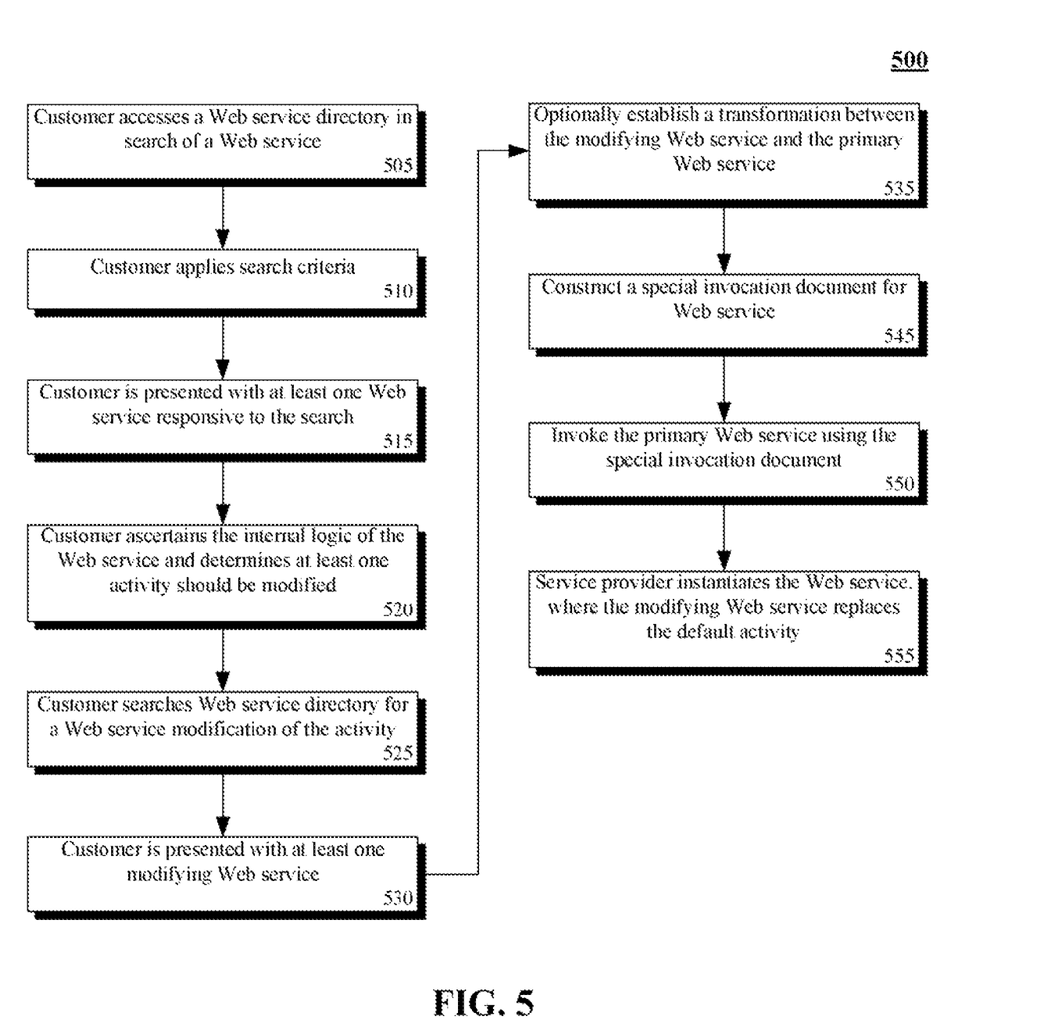
FIG. 5 is a flow chart of a method for specially invoking Web services in accordance with an embodiment of the inventive arrangements disclosed herein.

FIG. 5 is a flow chart of a method 500 for specially invoking Web services in accordance with an embodiment of the inventive arrangements disclosed herein. Method 500 can be performed in the context of system 100.

Method 500 can begin in step 505, when a customer accesses a Web service directory, such as a UDDI directory, in search of a Web service. In step 510, the customer can input search criteria. In step 515, the customer can be presented with at least one Web service responsive to the search. In step 520, the customer can ascertain the internal logic of the Web service and can determine if at least one activity specified by the internal logic flow of the Web service should be modified. The internal logic of the Web service can be maintained by the service directory. In step 525, the customer can search the Web service directory for Web service modifications of the non-desired activity. Different third party venders can specialize in providing Web services that modify one or more activities of other Web services.

In step 530, the customer can be presented with at least one modifying Web service responsive to the directory search. In step 535, a transform can be optionally established between the modifying Web service and the primary Web service. Transforms are only necessary when parameters vary between a modifying web service and the activity being modified. In step 545, a special invocation document can be constructed for the Web service. In step 550, the primary Web service can be invoked specially using the special invocation document. In step 555, the service provider can instantiate the Web service, where the modifying Web service replaces the default activity of the primary Web service in this instance of the Web service.

Figure 6:
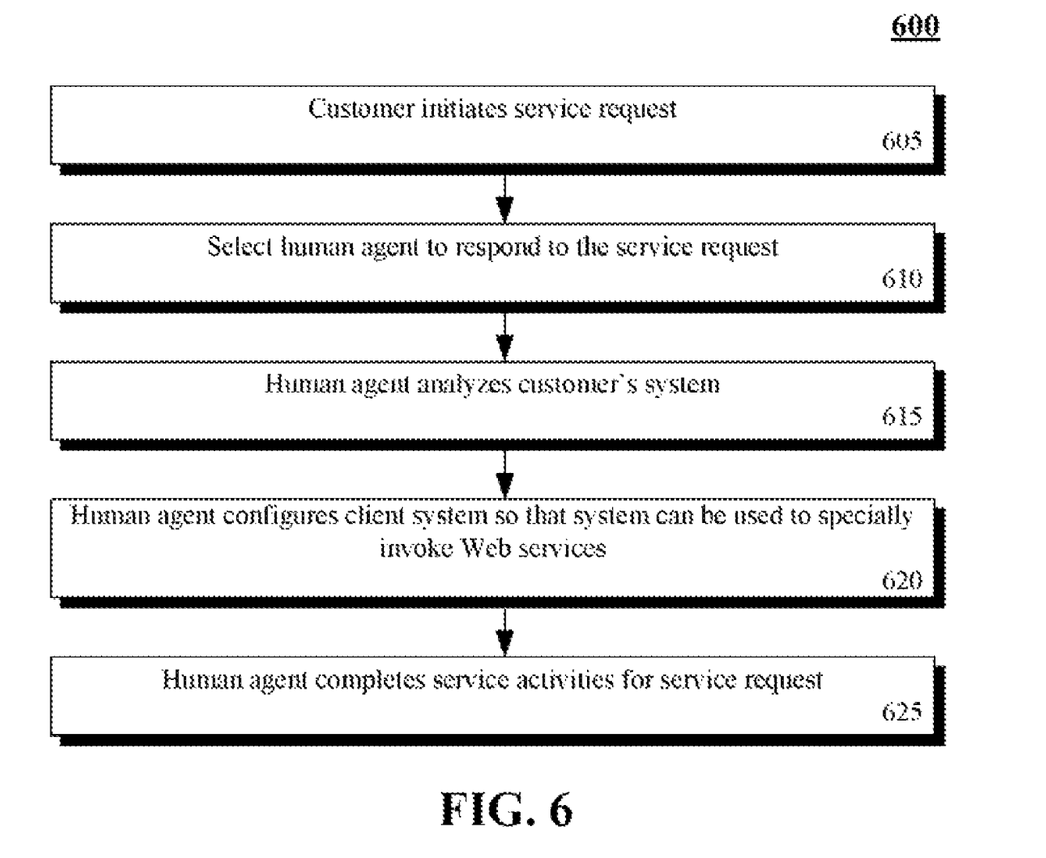
FIG. 6 is a flow chart of a method where a service agent can configure a system having Web services with exposed logic flows in accordance with an embodiment of the inventive arrangements disclosed herein.

FIG. 6 is a flow chart of a method 600 where a service agent can configure a system having Web services with exposed logic flows in accordance with an embodiment of the inventive arrangements disclosed herein. Method 600 can be preformed in the context of system 100 and/or method 500.

Method 600 can begin in step 605, when a customer initiates a service request. The service request can be a request for a service agent to establish a new system for Web services or to modify or troubleshoot a component of an existing system. The service request can be made by a service provider, a user of a Web service, and/or an entity that provides an online service directory. Thus, the service agent can provide assistance with any aspect of providing, utilizing, developing, and/or cataloging Web services having exposed and modifiable logic flows. In step 610, a human agent can be selected to respond to the service request. In step 615, the human agent can analyze a customer's current system and can develop a solution.

In step 620, the human agent can configure the customer's system so that the system is able to be used to specially invoke Web services as described herein. In step 625, the human agent can complete the service activities.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for specifying Web service behavior comprising:
    computing equipment exposing an internal logic flow of a Web service to clients, wherein each client is a computing device comprising hardware, wherein the internal logic flow includes at least one activity;
    the computing equipment receiving a special invocation command for the Web service from a client, wherein the special invocation command specifies a modification for the at least one activity, wherein the modification specifies a second Web service; and
    the computing equipment invoking an instance of the Web service for the client, wherein the Web service instance implements the modification, wherein the Web service instance executes the second Web service in place of the at least one activity, wherein the special invocation command is part of an XML document having standardized sections for specifying the modification and related parameters, wherein the standardized sections comprise an interface signature section, an implementation logic section, and a license and digital rights management (DRM) section, wherein the interface signature section specifies inputs and outputs of the at least one activity to be replaced by the modification and specifies whether a transform is needed to reconcile differences between the at least one activity and the modification, wherein the implementation logic section specifies a location for execution code of the modification, and wherein the license and digital rights management section establishes legal agreements relating to the Web service and the modification.

2. The method of claim 1, wherein the modification includes a set of machine readable instructions stored in a storage medium generated by an entity other than a service provider of the Web service.

3. The method of claim 2, wherein the set of machine readable instructions stored in a storage medium are executed in place of a set of machine readable instructions associated with the at least one activity.

4. The method of claim 1, wherein interfaces for the at least one activity of the Web service and the second Web service differ said method further comprising:
    the computing equipment executing a transform to reconcile differences between the interfaces of the at least one activity and the interfaces of the second Web service.

5. The method of claim 1, wherein the second Web service is provided by a service provider other than the service provider that provides the Web service.

6. The method of claim 1, wherein the Web service is published in an online directory of Web services, and wherein the exposed logical flow is accessible to the client through the online directory.

7. The method of claim 6, wherein the online directory includes special invocation instructions for formatting the special invocation command that invokes the Web service instance that implements the modification.

8. The method of claim 1, wherein said steps of claim 1 are steps performed by at least one machine in accordance with at least one computer program having a plurality of code sections that are executable by the at least one machine.

9. A method for a client, which is a computing device comprising hardware, to selectively modify a Web service comprising:
    the client selecting a Web service provided by a service provider;
    a service provider ascertaining a logical flow of the Web service, said logical flow comprising at least one activity, wherein when the Web service is invoked normally, the service provider executes code associated with the at least one activity;
    the client specifying a different Web service that is to replace the at least one activity; and
    the service provider specially invoking the Web service causing the Web service to execute the different Web service in place of code typically associated with the at least one activity, wherein the specially invoking step utilizes an XML based document to specify parameters, wherein said XML based document comprises standardized sections for specifying a modification and related parameters, wherein the standardized sections comprise an interface signature section, an implementation logic section, and a license and digital rights management (DRM) section, wherein the interface signature section specifies inputs and outputs of the at least one activity to be replaced by the modification and specifies whether a transform is needed to reconcile differences between the at least one activity and the modification, wherein the implementation logic section specifies a location for execution code of the modification, and wherein the license and digital rights management section establishes legal agreements relating to the Web service and the modification.

10. The method of claim 9, wherein the different Web service is provided by an entity other than the service provider.

11. The method of claim 9, wherein the specially invoking step utilizes the XML based document to specify parameters for the different Web service and to convey a URL for the different Web service to the service provider.

12. The method of claim 9, wherein the Web service is published in an online directory of Web service, and wherein the logical flow is accessible through the online directory.

13. The method of claim 9, wherein the different Web service is published in an online directory of Web services, wherein interfaces for the at least one activity of the Web service and the different Web service differ, said method further comprising:
the service provider executing a transform to reconcile differences between the interfaces of the at least one activity and the interfaces of the different Web service.

14. The method of claim 9, wherein the different Web service is published in an online directory of Web services, said method further comprising:
a service directory searching the online directory based upon user specified parameters;
the service provider receiving the Web service as a result of the searching step; and
the service provider receiving an option to specially invoke the Web service in accordance with the different Web service as a result of the searching step.

15. The method of claim 9, wherein said steps of claim 9 are steps performed by at least one machine in accordance with at least one computer program having a plurality of code sections that are executable by the at least one machine.

16. A system comprising a combination of hardware and software for providing Web services that permit calling applications to modify internal logic flow of the Web services comprising:

a storage medium storing a Web service that exposes internal logic flow, said internal logic flow comprising a plurality of activities, wherein said Web service is a reusable software building block implemented as a computer program product stored in a storage medium, where the computer program product is executable by a computing system;

a user-selectable option, implemented within a computer program product stored in a storage medium, for invoking the Web service normally, which causes the Web service to execute the plurality of activities in accordance with the internal logic flow; and a user selectable option, implemented within a computer program product stored in a storage medium, for specially invoking the Web service, which causes the Web service to substitute a user specified modification in the place of one of the plurality of activities while executing unmodified ones of the plurality of activities in accordance with the internal logic flow, wherein the user specified modification is specified in an XML based document, wherein said XML based document comprises standardized sections for specifying a modification and related parameters, wherein the standardized sections comprise an interface signature section, an implementation logic section, and a license and digital rights management (DRM) section, wherein the interface signature section specifies inputs and outputs of the at least one activity to be replaced by the modification and specifies whether a transform is needed to reconcile differences between the at least one activity and the modification, wherein the implementation logic section specifies a location for execution code of the modification, and wherein the license and digital rights management section establishes legal agreements relating to the Web service and the modification.

17. The system of claim 16, wherein the user specified modification is a different Web service specified by a URL, wherein different service providers provide the Web service and the different Web service.

* * * * *